United States Patent
Lienhart (10) Patent No.: US 11,852,238 B2
(45) Date of Patent: Dec. 26, 2023

(54) AXIAL ADJUSTMENT DEVICE AND ACTUATION ARRANGEMENT COMPRISING SUCH AN AXIAL ADJUSTMENT DEVICE

(71) Applicant: MAGNA Powertrain GmbH & Co KG, Lannach (AT)

(72) Inventor: Stefan Lienhart, Graz (AT)

(73) Assignee: MAGNA POWERTRAIN GMBH & CO KG, Lannach (AT)

(*) Notice: Subject to any disclaimer, the term of this patent is extended or adjusted under 35 U.S.C. 154(b) by 0 days.

(21) Appl. No.: 17/762,158

(22) PCT Filed: Oct. 13, 2020

(86) PCT No.: PCT/EP2020/078773
§ 371 (c)(1),
(2) Date: Mar. 21, 2022

(87) PCT Pub. No.: WO2021/074147
PCT Pub. Date: Apr. 22, 2021

(65) Prior Publication Data
US 2022/0373084 A1    Nov. 24, 2022

(30) Foreign Application Priority Data
Oct. 17, 2019  (DE) .............. 10 2019 216 016.6

(51) Int. Cl.
*F16H 63/34* (2006.01)
*F16H 63/30* (2006.01)
*B60K 6/405* (2007.10)

(52) U.S. Cl.
CPC ..... *F16H 63/3466* (2013.01); *F16H 63/3043* (2013.01); *F16H 63/3425* (2013.01); *B60K 6/405* (2013.01)

(58) Field of Classification Search
CPC ............ F16H 63/3466; F16H 63/3043; F16H 63/3425; F16H 63/46; F16D 63/006;
(Continued)

(56) References Cited

U.S. PATENT DOCUMENTS

| | | | | |
|---|---|---|---|---|
| 7,540,820 | B2* | 6/2009 | Mizon | B60K 17/3467 475/204 |
| 7,585,246 | B2* | 9/2009 | Chludek | F16H 48/27 475/233 |

(Continued)

FOREIGN PATENT DOCUMENTS

| | | |
|---|---|---|
| DE | 102005022218 A1 | 12/2005 |
| DE | 102008042388 A1 | 4/2010 |

(Continued)

*Primary Examiner* — Jacob S. Scott
*Assistant Examiner* — Farhana Pervin
(74) *Attorney, Agent, or Firm* — Dickinson Wright PLLC (57) ABSTRACT

Axial adjustment device (1), comprising a first disk (2) which is rotatable and axially displaceable both in a first circumferential direction (I) and in a second circumferential direction (II), namely a circumferential direction counter to the first circumferential direction (I), and a second disk (3) which is locked against rotation in the first circumferential direction (I) and is rotatable in the second circumferential direction, wherein the second disk (3) has an activating element (8) on its end side facing away from the first disk (2), and wherein the first disk (2) and the second disk (3) each have, on their mutually facing end surfaces, at least three identically formed depressions (4) which lie opposite one another in each case in pairs and thus form at least three pairs of depressions, wherein a rolling element (5) is arranged in each of the pairs of depressions, wherein the depressions (4) each have a slope in the first circumferential direction (I) from a lower dead centre (6) towards an upper (Continued)

dead centre (7), and an actuation arrangement, comprising such an axial adjustment device.

15 Claims, 12 Drawing Sheets

(58) Field of Classification Search
CPC .......... F16D 2023/123; F16D 2125/36; F16D 28/00; F16D 27/115; F16D 2127/06
See application file for complete search history.

(56) References Cited

U.S. PATENT DOCUMENTS

| | | | | |
|---|---|---|---|---|
| 7,896,146 | B2* | 3/2011 | Pritchard | F16D 28/00 |
| | | | | 192/70.23 |
| 9,242,636 | B2* | 1/2016 | Helmer | F16D 28/00 |
| 10,030,697 | B2* | 7/2018 | Carr | F16C 19/30 |
| 10,479,199 | B2* | 11/2019 | Niimura | F16D 13/52 |
| 10,994,609 | B2* | 5/2021 | Rudagi | F16H 25/125 |
| 2001/0029221 | A1* | 10/2001 | Oliveira | F16H 61/0437 |
| | | | | 477/110 |
| 2002/0077212 | A1* | 6/2002 | Krisher | F16H 48/34 |
| | | | | 475/86 |
| 2004/0134724 | A1* | 7/2004 | Katsnelson | F16D 55/36 |
| | | | | 188/72.7 |
| 2004/0163916 | A1* | 8/2004 | Showalter | F16H 63/304 |
| | | | | 192/48.5 |
| 2005/0143220 | A1* | 6/2005 | Berger | B60W 30/18054 |
| | | | | 477/96 |
| 2015/0033887 | A1* | 2/2015 | Remmler | F16H 63/3043 |
| | | | | 74/335 |

FOREIGN PATENT DOCUMENTS

| | | |
|---|---|---|
| DE | 102018202022 A1 | 8/2019 |
| EP | 3184840 A1 | 6/2017 |
| JP | 2014181739 A | 9/2014 |

* cited by examiner

AXIAL ADJUSTMENT DEVICE AND ACTUATION ARRANGEMENT COMPRISING SUCH AN AXIAL ADJUSTMENT DEVICE

CROSS-REFERENCE TO RELATED APPLICATIONS

This application is a U.S. National Stage of International Application No. PCT/EP2020/078773, filed on Oct. 13, 2020, which claims the benefit and priority of German Patent Application No. DE 10 2019 216 016.6, filed on Oct. 17, 2019, the entire contents of which are incorporated herein by reference.

FIELD OF THE INVENTION

The present invention relates to an axial adjustment device and to an actuation arrangement for actuating a clutch unit and a parking lock mechanism, comprising such an axial adjustment device.

PRIOR ART

Axial adjustment devices are used to convert a rotational driving movement by a drive unit, namely as a rule an electric motor, into a translatory actuation movement, for example for actuating a multi-plate clutch. Owing to specifications relevant to construction space and components and therefore also costs in the design and development of motor vehicles, it is generally advantageous to use synergies within the construction. One such synergy is the adjustment of a plurality of mechanical components using a single adjustment system since the use of a multiplicity of independent adjustment systems, apart from the increasing complexity of the construction, requires firstly a large amount of construction space and secondly increased costs.

SUMMARY OF THE INVENTION

It is firstly an object of the invention to specify an axial adjustment device via which at least two mechanical elements can be switched independently of one another when required. Secondly, it is an object of the invention to specify an actuation arrangement for actuating a clutch unit and a parking lock mechanism, which actuation arrangement is distinguished by a construction that is particularly optimized in terms of construction space and components.

These objects can be achieved by the subject matter of the present invention according to independent claims 1 and 2. Advantageous embodiments of the present invention are described in the dependent claims.

The axial adjustment device according to the invention comprises a first disk and a second disk.

According to the invention, the first disk is rotatable and axially displaceable both in a first circumferential direction and in a second circumferential direction, namely in a circumferential direction counter to the first circumferential direction.

According to the invention, the second disk locked against rotation in the first circumferential direction and is rotatable in the second circumferential direction.

According to the present invention, the second disk has an activating element on its end side facing away from the first disk. The activating element can be designed, for example, as a cam.

Furthermore, according to the invention, the first disk and the second disk each have, on their mutually facing end surfaces, at least three identically formed depressions which lie opposite one another in each case in pairs and thus form at least three pairs of depressions. According to the invention, a rolling element is arranged in each of the pairs of depressions. The rolling element can be, for example, a ball.

According to the invention, the depressions each have a slope in the first circumferential direction from a lower dead centre towards an upper dead centre. The slope can be of multi-step design, for example of two-step design, i.e. comprising a first portion with a first slope and comprising a second portion with a second slope different from the first slope.

According to the invention, the pairs of depressions each interact via the rolling elements in such a manner that, when the first disk is rotated in a first circumferential direction, the rolling elements run from the lower dead centre in the direction of the upper dead centre, and therefore the first disk is rotated and displaced axially with respect to the second disk, and that, when the first disk is rotated in the second circumferential direction, the rolling elements run into the lower dead centre of the depressions, and therefore the first disk and the second disk in the assembly are rotated in the second circumferential direction.

The axial adjustment device according to the invention, while having the simplest structural design, permits two mechanical components within a motor vehicle drive train to be switched substantially independently of each other.

The actuating arrangement according to the invention is used for actuating two mechanical components within a motor vehicle drive train, namely a clutch unit and a parking lock mechanism.

According to the invention, the actuation arrangement comprises a clutch unit, a parking lock mechanism, an actuator, and an axial adjustment device according to the invention.

According to the present invention, the first disk of the axial adjustment device can be activated via the actuator in the first circumferential direction and in the second circumferential direction.

The actuation arrangement is configured according to the invention in such a manner that, when the first disk is activated in the first circumferential direction, the clutch unit is actuated into an engagement position, and, when the first disk is activated in the second circumferential direction, the clutch unit is actuated into a disengagement position and the parking lock mechanism is optionally activated.

The design according to the invention of the actuation arrangement permits the actuation of two independent mechanical components of a motor vehicle drive train, namely a clutch unit and a parking lock mechanism, using a single actuator and a single axial adjustment device. The synergistic use of the actuator and the axial adjustment device for switching or actuating the clutch unit and the parking lock mechanism enables the production of a design which is optimized in terms of components, construction space and costs.

The actuator is preferably configured as an electric motor. Furthermore, the actuator is connected in terms of drive preferably via a reduction gearing to the axial adjustment device, namely to the first disk of the axial adjustment device.

The clutch unit can have a frictionally locking, form-fitting or force-fitting clutch.

The actuation arrangement is preferably arranged in a functionally effective manner on a side shaft of a motor vehicle axle.

BRIEF DESCRIPTION OF THE DRAWINGS

The invention will be described below by way of example with reference to the drawings.

DETAILED DESCRIPTION OF THE INVENTION

The subject matter of the invention will be described below with reference to an example according to the present figures, namely FIG. 1 to FIG. 12.

Figure 1:
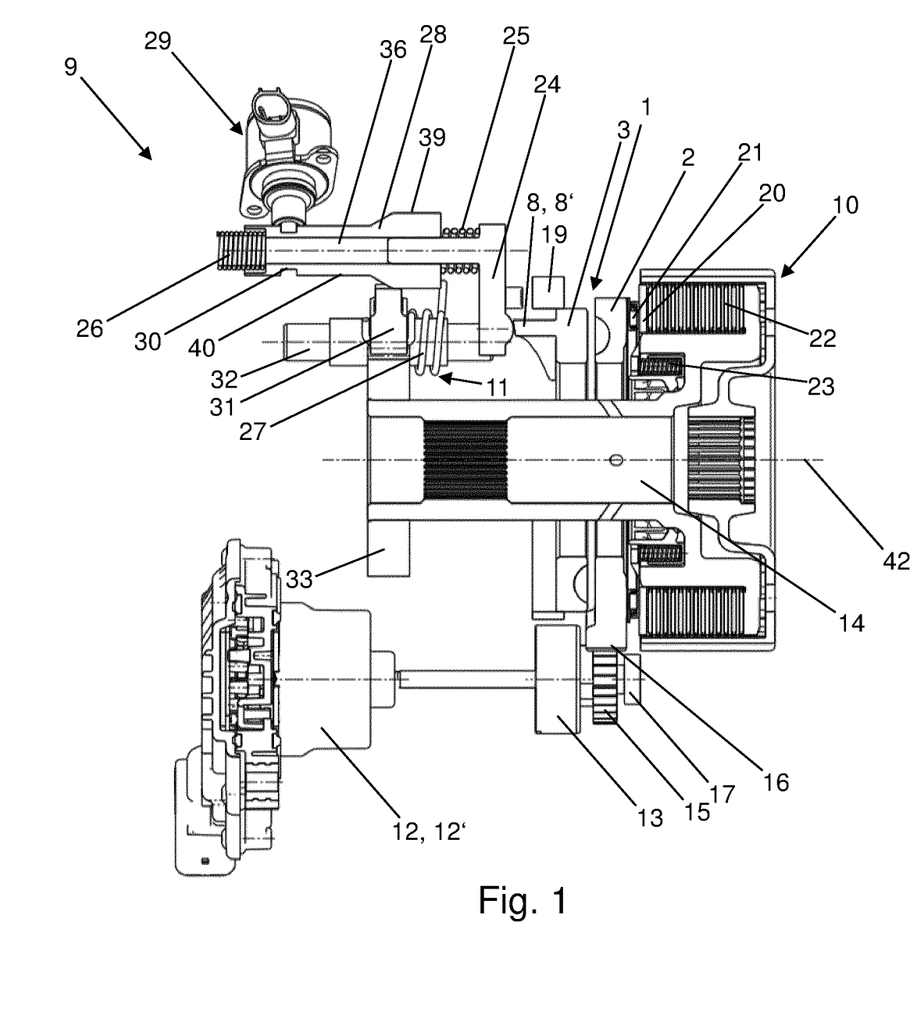
FIG. 1 shows a schematic view of an actuation arrangement.

FIG. 1 illustrates an exemplary actuation arrangement 9. The actuation arrangement 1 is arranged in a functionally effective manner on a side shaft 14 of a motor vehicle axle.

The actuation arrangement 9 has a clutch unit 10, a parking lock mechanism 11, an actuator 12, and an axial adjustment device 1.

The directional detail "axially" describes a direction along or parallel to a central axis of rotation 42 of the side shaft 14.

The directional detail "radially" describes a direction perpendicular to the central axis of rotation 42 of the side shaft 14.

The actuator 12 is configured as an electric motor 12' and can rotate both in a first direction of rotation and in a second direction of rotation. The electric motor 12' is connected in terms of drive via a reduction gearing 13, namely a planetary gearing and a spur gear 15, to the axial adjustment device 1, more precisely to a first disk 2 of the axial adjustment device 1. The spur gear 15 is mounted via the planetary gearing and an additional deep-groove ball bearing 17 in a housing of the actuation arrangement 9.

The axial adjustment device 1 is configured in the form of a ball ramp arrangement and comprises a first disk 2, a second disk 3 and balls 5' as rolling elements 5.

Figure 4:
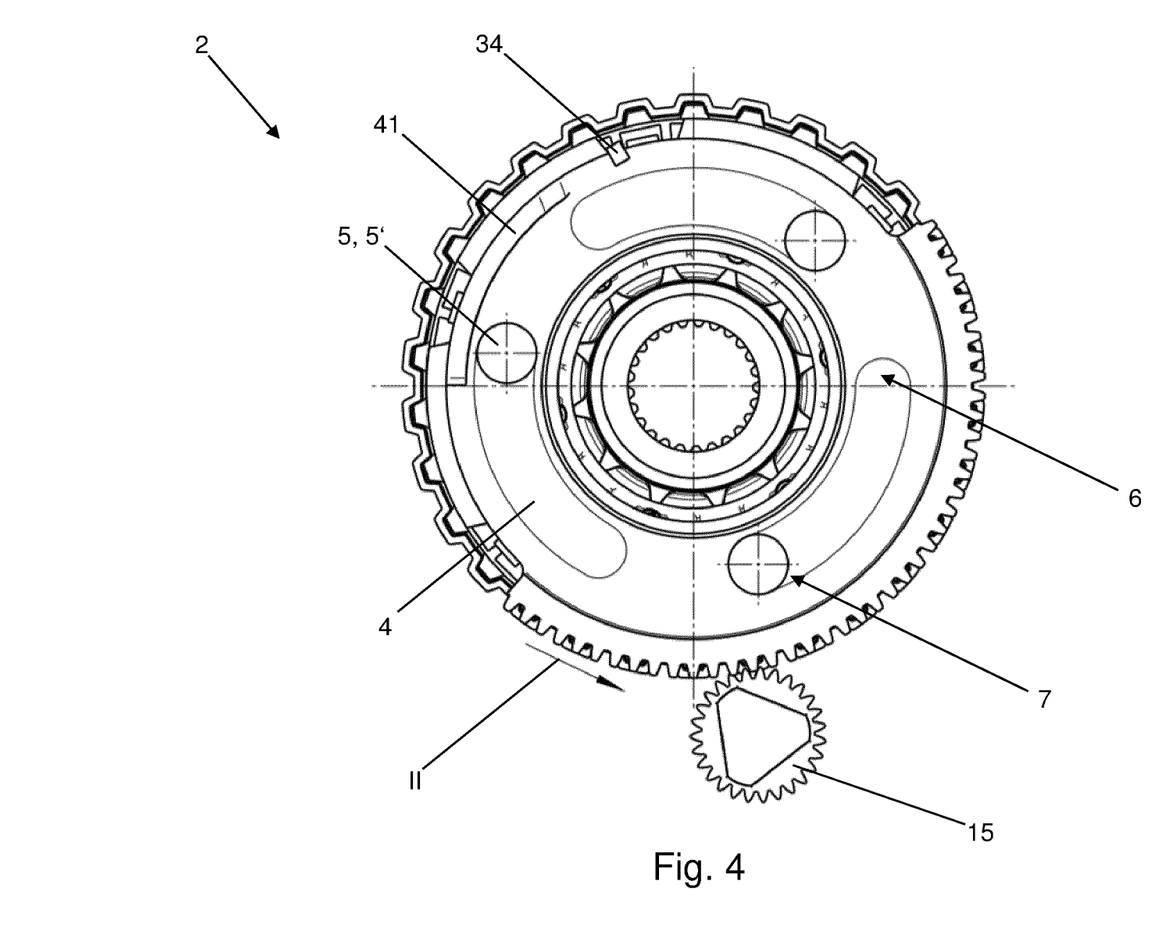
FIG. 4 shows a schematic illustration of a first disk and a second disk with balls in the assembly.

The first disk 2 and the second disk 3 each have, at their mutually facing end surfaces, three identically formed depressions 4 which lie opposite one another in each case in pairs, and thus form at least three pairs of depressions. A ball 5' is arranged in each of the pairs of depressions. The depressions 4 each have a slope in the first circumferential direction I from a lower dead centre 6 towards an upper dead centre 7.

The first disk 2 is rotatable and axially displaceable both in a first circumferential direction I and in a second circumferential direction II, namely a circumferential direction counter to the first circumferential direction I. The outer circumference of the first disk 2 has an external toothing 16 in which the toothing of the spur gear 15 engages.

Figure 2:
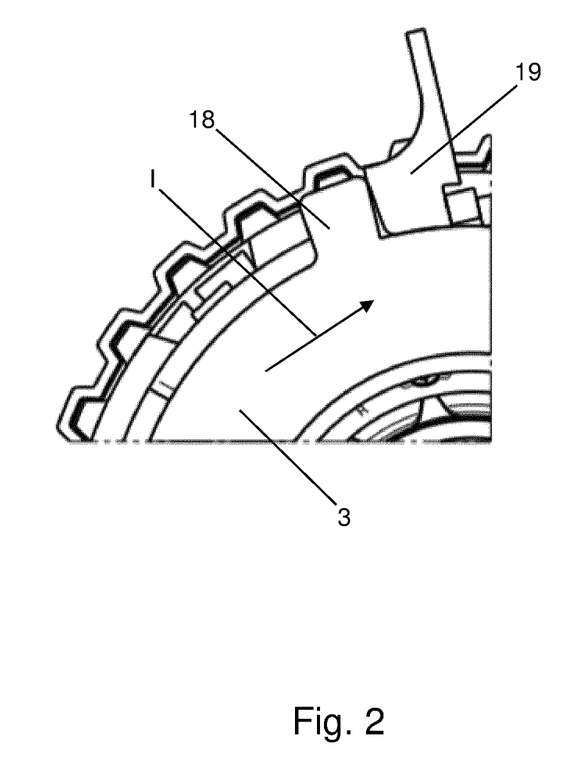
FIG. 2 shows a schematic illustration for rotationally locking a second disk in a first circumferential direction.
Figure 3:
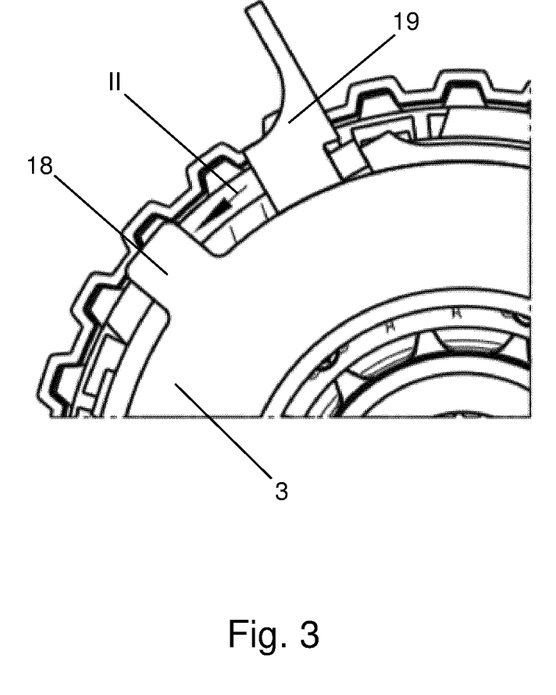
FIG. 3 shows a schematic illustration for rotating a second disk in a second circumferential direction.

The second disk 3 is locked against rotation in the circumferential direction I and is rotatable in the second circumferential direction II. The second disk 3 is locked against rotation by a radial lug 18 on the outer circumference of the second disk 3, said lug bearing against a housing part 19 of the actuation arrangement 9.

The clutch unit 10 is configured as a multi-plate clutch and serves for coupling or decoupling a wheel arrangement from the side shaft 14. However, a configuration of the clutch unit 10 as a dog clutch is also conceivable.

By rotation of the first disk 2 in the first circumferential direction I, for example by the electric motor 12' being energized and the electric motor 12' being rotated in the first direction of rotation, said disk is displaced axially, by movement of the balls 5' in the respective pairs of depressions, from the lower dead centre 6 towards the upper dead centre 7 (to the right with respect to FIG. 1) and presses a pressure plate 20 via an axial needle bearing 21 against a plate assembly 22 of the clutch unit 10—the clutch unit 10 is activated in the engagement direction. Clutch springs 23 of the clutch unit 10 are pretensioned in the process. The torque arising during the rotation of the first disk 2 is supported in the housing by the rotational lock at the second disk 3.

The parking lock mechanism 11 serves for locking the side shaft 14. The parking lock mechanism 11 has a closure element 24, three elastic elements, namely a first spring element 25, a second spring element 26 and a third spring element 27, an axial cam 28, a solenoid 29, a parking lock pawl 31, a pawl lever bolt 32 and a parking lock wheel 33.

Figure 12:
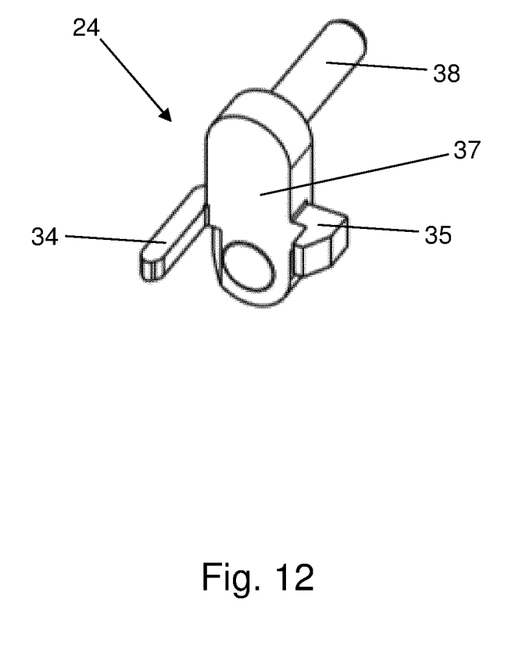
FIG. 12 shows an isometric view of a closure element.

The closure element 24 has a radially running region 37 and an axially running region 38. Furthermore, a closure lever 34 and a fixing claw 35 are formed on the radially running region 37 of the closure element 24. Both the closure lever 34 and the fixing claw extend in an axial direction counter to the axial direction in which the axially running region 38 of the closure element 24 extends (FIG. 12).

The axial cam 28 of the parking lock mechanism is configured to be substantially hollow and therefore has a central, axially running cavity 36. The axially running region 38 of the closure element 24 extends partially into the cavity 36 of the axial cam 28. The first spring element 25 is arranged between the radially running region 37 of the adjustment element 24, around the axially running region 38, and the axial cam 28. The axial cam 28 has a first region 39 and a second region 40. The first region 39 has a larger diameter with respect to the second region 40 of the axial cam 28. The axial cam 28 has an encircling arresting groove 30 in the second region. Furthermore, the axial cam 28 is pretensioned counter to the closure element 24 via the second spring element 26.

The pawl bolt 32 of the parking lock mechanism 11 is arranged substantially parallel to the axial cam 28.

The parking lock pawl 31 is arranged pivotably on the pawl bolt 32 and is pretensioned counter to the axial cam 28 via the third spring element.

Figure 8:
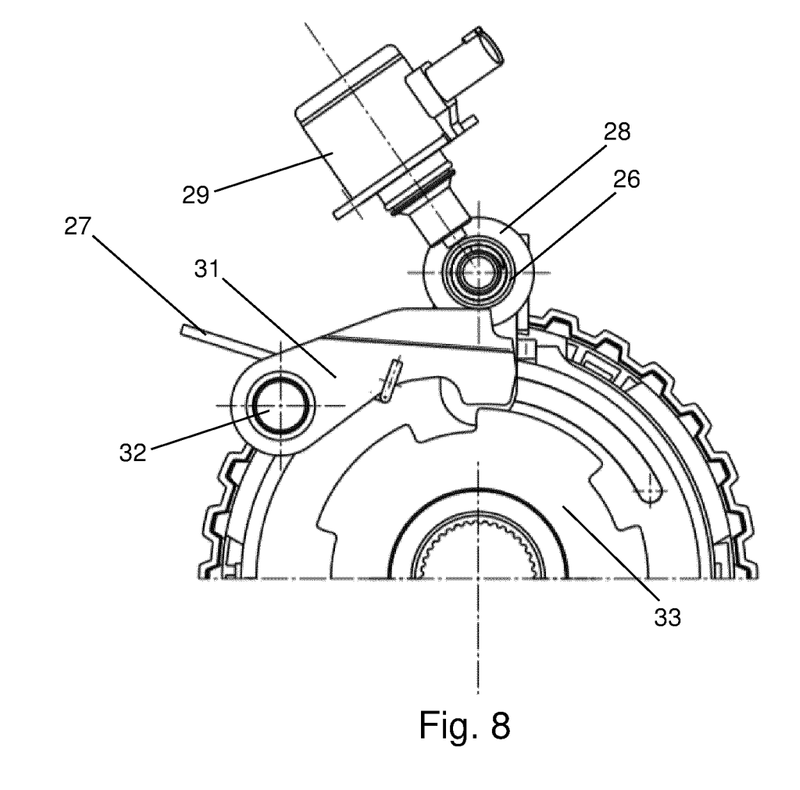
FIG. 8 shows a schematic illustration of a parking lock mechanism with a released pawl wheel.
Figure 9:
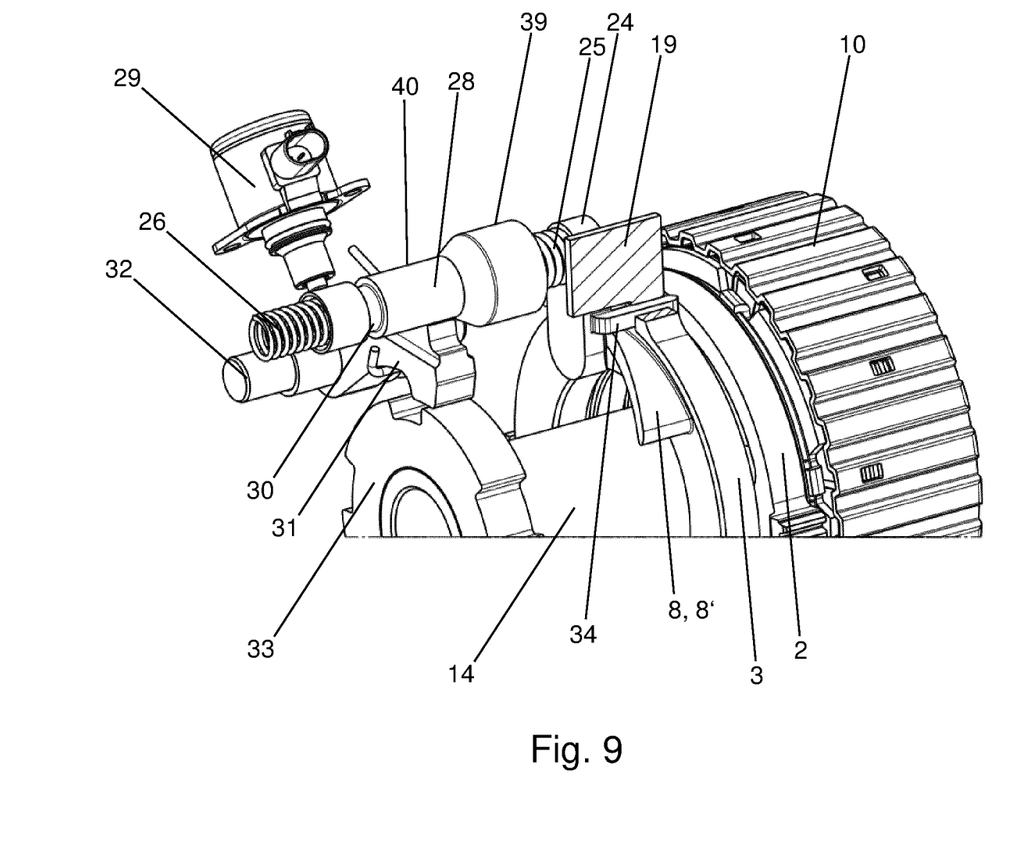
FIG. 9 shows an isometric illustration of an inactive parking lock mechanism.

When the parking lock mechanism 11 is deactivated, the parking lock pawl 31 is pressed counter to the second region 40 of the axial cam via the third spring element 27.

Figure 6:
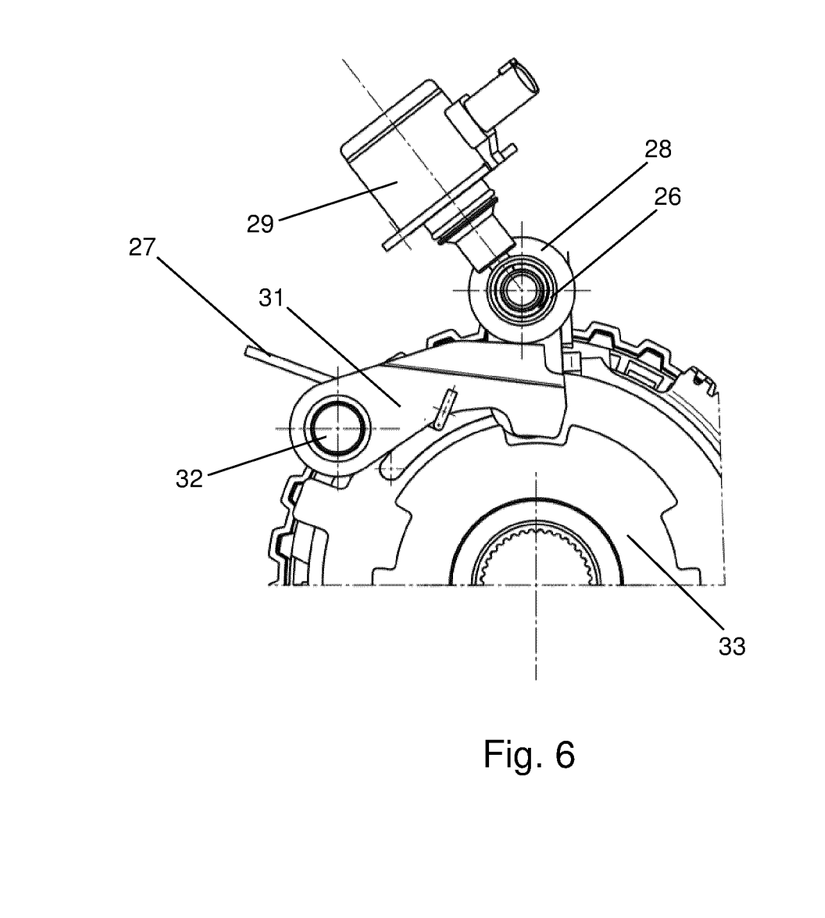
FIG. 6 shows a schematic illustration of a parking lock mechanism with a latched pawl lever.

When the parking lock mechanism 11 is activated, the parking lock pawl 31 is latched into the parking lock wheel 33 counter to the force of the third spring element 27 via the axial cam 28, namely the first region 39 of the axial cam 28.

The parking lock wheel 33 is arranged fixedly, namely fixed in terms of rotation and fixed axially, on the side shaft 15.

If the electric motor 12' is switched currentlessly or operated in the second direction of rotation, the first disk 2 of the axial adjustment device 1 is rotated in the second circumferential direction II, as a result of which the balls 5' move in the pairs of depressions between the first disk 2 and the second disk 3 from the upper dead centre 7 into the lower dead centre 6—the clutch unit 10 is activated in the disengagement direction. Further rotation of the first disk 2 in the second circumferential direction II and therefore counter to the running direction of the depressions 4 causes the first disk 2 and the second disk 3 in the assembly, namely in the disk assembly, to rotate.

Figure 5:
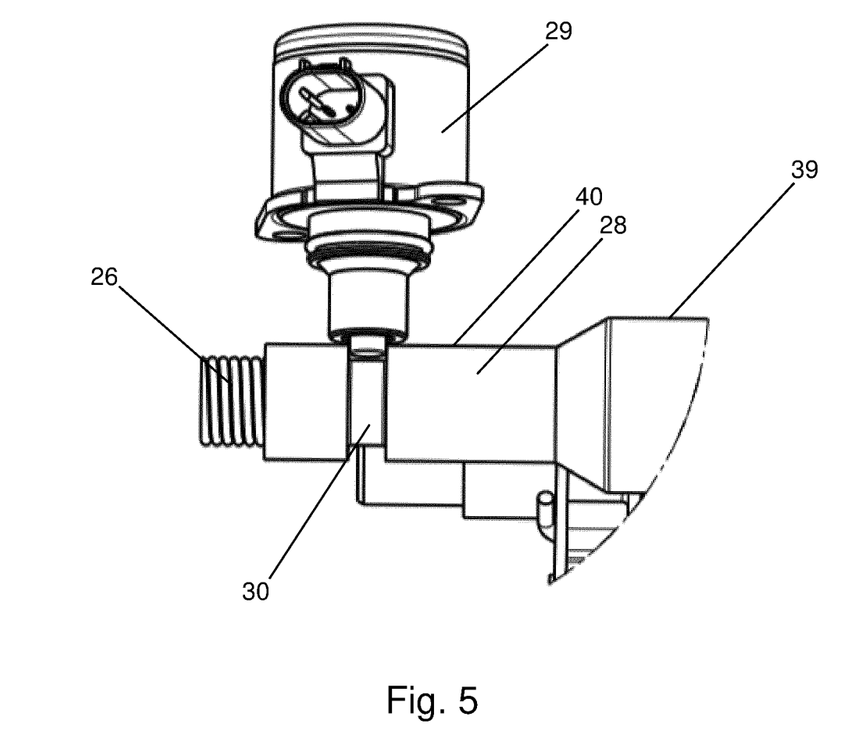
FIG. 5 shows a schematic illustration of a solenoid of a parking lock mechanism in an arrested position.
Figure 10:
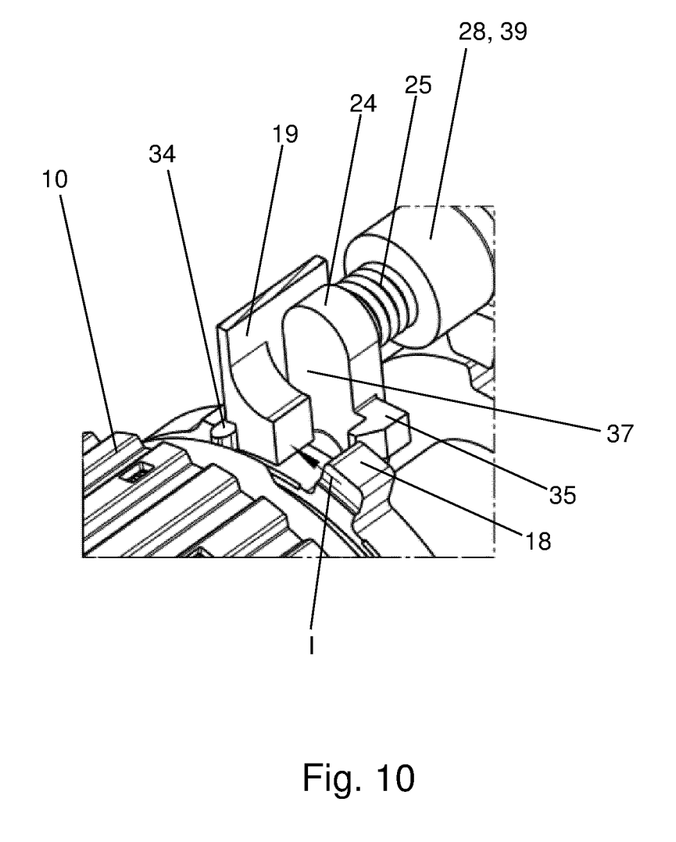
FIG. 10 shows an isometric view for rotating a disk assembly, namely a first disk and a second disk in the assembly.

The second disk 3 has an activating element 8 in the form of a cam 8' on its end side facing away from the first disk 2. During the rotation of the disk assembly, namely in the second circumferential direction II, said cam 8' presses against the closure element 24 of the parking lock mechanism 11. The closure element 24 is locked against rotation, but is movable axially. By activation of the closure element 24 via the cam 8', the closure element 24 is displaced axially together with the first spring element 25 and the axial cam 28 counter to the force of the second spring element 26. Owing to the jump in diameter between the first region 36 and the second region 40 of the axial cam 28, the parking lock pawl 31 is pressed via the first region 39 of the axial cam 28 into the parking lock wheel 33 counter to the spring force of the third spring element 27 and the parking lock mechanism 11 is activated. In order to maintain the activation of the parking lock mechanism 11 currentlessly, the solenoid 29, which has been extended without being energized, latches into the arresting groove 30 of the axial cam 28.

Figure 7:
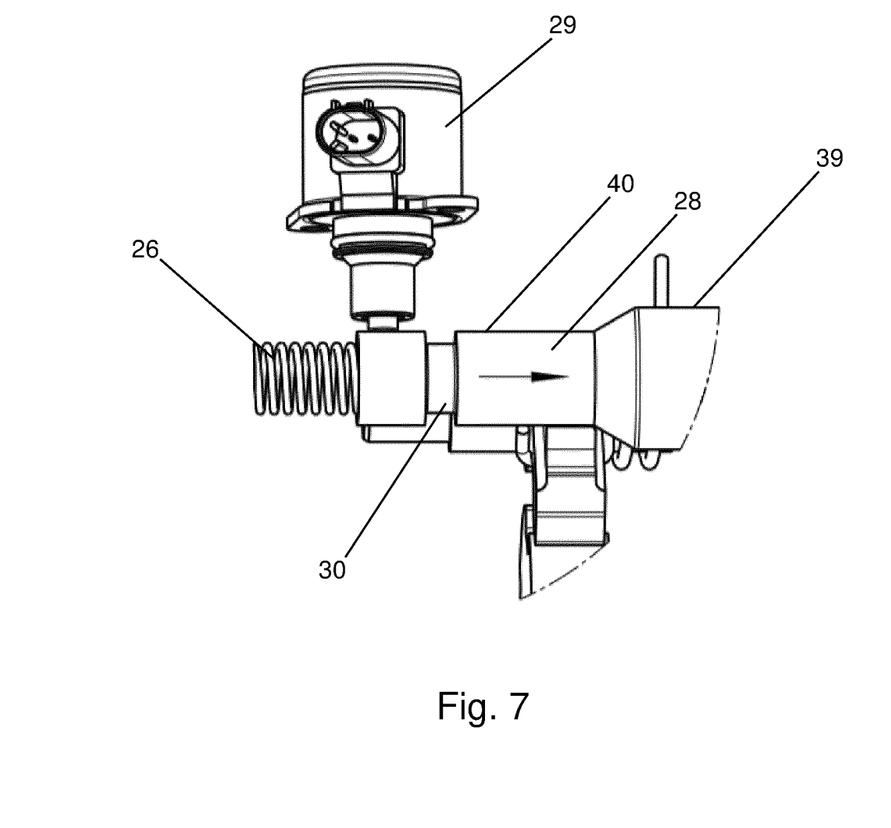
FIG. 7 shows a schematic illustration of a solenoid of a parking lock mechanism in a non-arrested position.

In order to release, i.e. to deactivate, the parking lock mechanism 11, the solenoid 29 has to be energized, as a result of which it retracts and the axial cam 28 is pressed again axially in the direction of the closure element 24 (to the right with respect to FIG. 1) by the second spring element 26. The parking lock pawl 31 is then pressed via the third spring element 27 counter to the second region 40 of the axial cam 28 and releases the parking lock wheel 33.

Figure 11A:
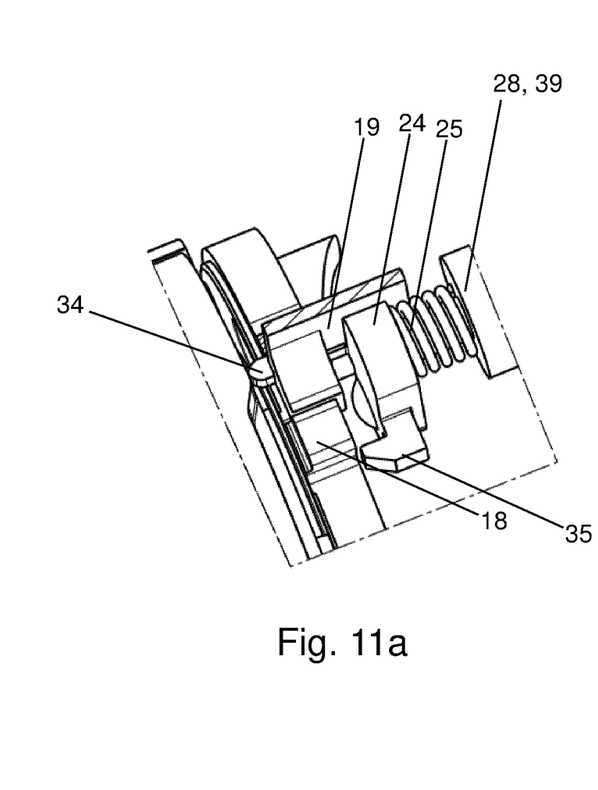
FIGS. 11a, 11b each show an isometric view for the process of latching a fixing claw by means of a closure lever and a slotted guide.
Figure 11B:
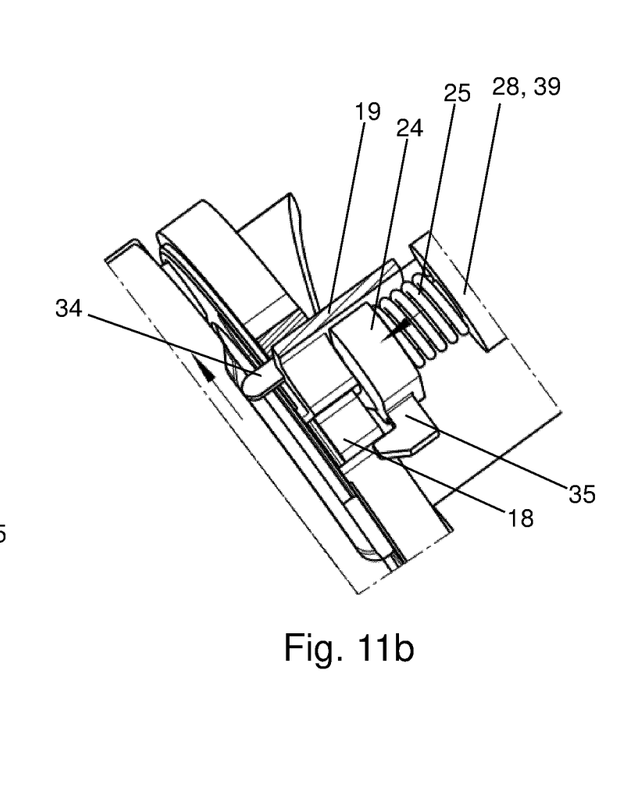

The depressions 4 are each of two-step configuration, i.e. they have a steeper first portion and a second portion which is more shallow in comparison to the first portion. By means of the two-step configuration of the depressions 4 on the disks 2, 3 of the axial adjustment device 1, the latter can be rotated by the electric motor 12' against the clutch spring 23 up to a certain limit torque. This takes place until the cam 8' lifts off from the closure element 24 and the latter bears with the closure lever 34 against a slotted guide 41 in the first disk 2. The disk assembly is then rotated further by the electric motor 12' against the clutch spring 23 until the radial lug 18 on the outer circumference of the second disk 3 bears against the housing part 19. As soon as the radial lug 18 bears again against the housing part 19, the first step of the two-step depression can be overcome and the closure lever 34 drops into the slotted guide 41. In the process, the closure element 24 drops forwards because of the spring force of the second spring element 26 and the fixing claw 35 fixes the radial lug 18 of the second disk 3 with respect to the housing part 19. The clutch unit 10 can now be activated, and hammering of the radial lug 18 against the housing part 19 is prevented. The fixing claw 35 is released in the reverse sequence.

If the slope of the depressions 4 is selected to be of an appropriate high or steep level, it is then also possible to dispense with the two-step configuration.

LIST OF REFERENCE SKINS

1 Axial adjustment device
2 First disk
3 Second disk
4 Depression
5 Rolling element
5' Ball
6 Lower dead centre
7 Upper dead centre
8 Activating element
8' Cam
9 Actuation arrangement
10 Clutch unit
11 Parking lock mechanism
12 Actuator
12' Electric motor
13 Reduction gearing
14 Side shaft
15 Spur gear
16 External toothing (of the first disk)
17 Deep-groove ball bearing
18 Radial lug
19 Housing part
20 Pressure plate
21 Axial needle bearing
22 Multi-plate assembly
23 Clutch spring
24 Closure element
25 First spring element
26 Second spring element
27 Third spring element
28 Axial cam
29 Solenoid
30 Arresting groove
31 Parking lock pawl
32 Pawl bolt
33 Parking lock wheel
34 Closure lever
35 Fixing claw
36 Cavity
37 Radially running region (of the adjustment element)
38 Axially running region (of the adjustment element)
39 First region (of the axial cam)
40 Second region (of the axial cam)
41 Slotted guide (in the first disk)
42 Central axis of rotation (of the side shaft)
I First circumferential direction
II Second circumferential direction

What is claimed is:
1. An axial adjustment device, comprising a first disk which is rotatable and axially displaceable both in a first circumferential direction and in a second circumferential direction, namely a circumferential direction counter to the first circumferential direction, and a second disk which is locked against rotation in the first circumferential direction and is rotatable in the second circumferential direction, wherein the second disk has an activating element on its end side facing away from the first disk, and wherein the first disk and the second disk each have, on their mutually facing end surfaces, at least three identically formed depressions which lie opposite one another in each case in pairs and thus form at least three pairs of depressions, wherein a rolling element is arranged in each of the pairs of depressions, wherein the depressions each have a slope in the first circumferential direction from a lower dead center towards an upper dead center, wherein the pairs of depressions each interact via the rolling elements in such a manner that, when the first disk is rotated in a first circumferential direction (I), the rolling elements run from the lower dead center in the direction of the upper dead center, and therefore the first disk is rotated and displaced axially with respect to the second disk, and that, when the first disk is rotated in the second circumferential direction, the rolling elements run into the lower dead center of the depressions, and therefore the first disk and the second disk are rotated in the second circumferential direction, wherein the first disk is actuated by an actuator;

wherein actuation of the first disk of the axial adjustment device actuates both a clutch unit and a park lock mechanism;

wherein actuation of the clutch unit and activation of the parking lock mechanism is based on a direction of the rotation of a common disk, wherein the first disk is the common disk.

2. An actuation arrangement of a clutch unit and a parking lock mechanism, comprising:

the clutch unit, the parking lock mechanism, an actuator, and an axial adjustment device, the axial adjustment device comprising:

a first disk which is rotatable and axially displaceable both in a first circumferential direction and in a second circumferential direction, namely a circumferential direction counter to the first circumferential direction, and a second disk which is locked against rotation in the first circumferential direction and is rotatable in the second circumferential direction, wherein the second disk has an activating element on its end side facing away from the first disk, and wherein the first disk and the second disk each have, on their mutually facing end surfaces, at least three identically formed depressions which lie opposite one another in each case in pairs and thus form at least three pairs of depressions, wherein a rolling element is arranged in each of the pairs of depressions, wherein the depressions each have a slope in the first circumferential direction from a lower dead center towards an upper dead center, wherein the pairs of depressions each interact via the rolling elements in such a manner that, when the first disk is rotated in a first circumferential direction (I), the rolling elements run from the lower dead center in the direction of the upper dead center, and therefore the first disk is rotated and displaced axially with respect to the second disk, and that, when the first disk is rotated in the second circumferential direction, the rolling elements run into the lower dead center of the depressions, and therefore the first disk and the second disk are rotated in the second circumferential direction, wherein the first disk of the axial adjustment device can be activated via the actuator in the first circumferential direction and in the second circumferential direction, and wherein the actuation arrangement is configured in such a manner that, when the first disk is activated in the first circumferential direction, the clutch unit is actuated into an engagement position, and, when the first disk is activated in the second circumferential direction, the clutch unit is actuated into a disengagement position and the parking lock mechanism is activated.

3. The actuation arrangement according to claim 2, wherein the actuator is configured as an electric motor.

4. The actuation arrangement according to claim 2, wherein the actuator is connected in terms of drive via a reduction gearing to the axial adjustment device, namely to the first disk of the axial adjustment device.

5. The actuation arrangement according to claim 2, wherein the clutch unit has a frictionally locking, form-fitting or force-fitting clutch.

6. The actuation arrangement according to claim 2, wherein the actuation arrangement is arranged on a side shaft of a motor vehicle axle.

7. The actuation arrangement according to claim 2, wherein the parking lock mechanism is activated after the clutch unit is actuated into the disengagement position and upon further rotation of the first disk in the second circumferential direction.

8. An actuation arrangement comprising:

an actuator;

an axial adjustment device having a first disk and a second disk;

a clutch unit actuated and engaged by rotation of the first disk in a first circumferential direction and disengaged by rotation of the first disk and the second disk in a second circumferential direction that is opposite the first circumferential direction;

a parking lock mechanism actuated by rotation of the first disk and the second disk in the second circumferential direction;

wherein the first disk is rotatable and axially displaceable in both the first and second circumferential directions;

wherein the second disk is locked against rotation in the first circumferential direction and is rotatable in the second circumferential direction;

wherein the second disk has an activating element on its end side facing away from the first disk; and wherein the first disk and the second disk each have, on mutually facing end surfaces thereof, at least three depressions that lie opposite one another in each case in pairs and forming at least three pairs of depressions;

wherein a rolling element is arranged in each of the pairs of depressions;

wherein the depressions each have a slope in the first circumferential direction from a lower dead center towards an upper dead center;

wherein the pairs of depressions each interact via the rolling elements in such a manner that, when the first disk is rotated in the first circumferential direction, the rolling elements run from the lower dead center in the direction of the upper dead center, and therefore the first disk is rotated and displaced axially with respect to the second disk, and that, when the first disk is rotated in the second circumferential direction, the rolling elements run into the lower dead center of the depressions, and therefore the first disk and the second disk are rotated in the second circumferential direction.

9. The actuation arrangement of claim 8, wherein rotation of the first disk of the axial adjustment device in the first circumferential direction actuates the clutch unit into an engaged position; and wherein rotation of the first disk of the axial adjustment device in the second circumferential direction through a first range of travel actuates the clutch unit from the engaged position to a disengaged position.

10. The actuation arrangement of claim 9, wherein rotation of the first disk of the axial adjustment device in the second circumferential direction through a second range of travel following the first range of travel actuates the parking lock mechanism.

11. The actuation arrangement of claim 8, wherein the first disk is a common disk for actuating both the clutch unit and the parking lock mechanism depending on the direction of the rotation of the first disk.

12. The actuation arrangement of claim 8, wherein the activating element of the second disk is in the form of a cam, wherein the cam presses against a closure element of the parking lock mechanism when the second disk rotates in the second circumferential direction.

13. The actuation arrangement of claim 12, wherein the closure element is locked against rotation and is moveable axially.

14. The actuation arrangement of claim 8, wherein the depressions each have a two-step configuration including a first portion that is steeper than a second portion and a second portion that is shallower than the first portion.

15. The actuation arrangement of claim 8, wherein the second disk is locked against rotation in the first circumferential direction by a radial lug on an outer circumference of the second disk, wherein the radial lug bears against a housing part of the actuation arrangement.

\* \* \* \* \*